US006159329A

United States Patent [19]
Tschanz

[11] Patent Number: 6,159,329
[45] **Date of Patent: *Dec. 12, 2000**

[54] SELF-ADHESIVE GRAPH APPLIQUES

[76] Inventor: Charles M. Tschanz, 304 High Point Dr., Lindenhurst, Ill. 60046

[ * ] Notice: This patent issued on a continued prosecution application filed under 37 CFR 1.53(d), and is subject to the twenty year patent term provisions of 35 U.S.C. 154(a)(2).

[21] Appl. No.: 08/608,964

[22] Filed: Feb. 29, 1996

Related U.S. Application Data

[63] Continuation of application No. 08/192,054, Feb. 4, 1994, abandoned.

[51] Int. Cl.[7] .......... B32B 31/00

[52] U.S. Cl. .......... 156/277; 156/297; 156/299; 283/81; 428/40.1; 428/914; 434/188; 434/211; 434/197; 434/365

[58] Field of Search .......... 428/40.1, 41.7, 428/418, 42.1, 42.2, 42.3, 43, 354, 131, 78, 914; 156/250, 277, 297, 299; 434/188, 211, 197, 365

[56] References Cited

U.S. PATENT DOCUMENTS

| | | | |
|---|---|---|---|
| 3,812,600 | 5/1974 | Rondello | 434/430 |
| 4,109,938 | 8/1978 | Mitchell | 434/365 |
| 5,227,209 | 7/1993 | Garland | 428/43 |
| 5,370,538 | 12/1994 | Sidray | 434/211 |

*Primary Examiner*—Nasser Ahmad

[57] ABSTRACT

A method of incorporating small graphs on to pages of text or calculations by using small adhesive-backed appliques or labels which have been pre-printed with a graphical coordinate grid. These appliques eliminate the necessity of a separate piece of graph paper or the tedium of drawing or gluing a coordinate grid directly on the report or calculation page.

7 Claims, 4 Drawing Sheets

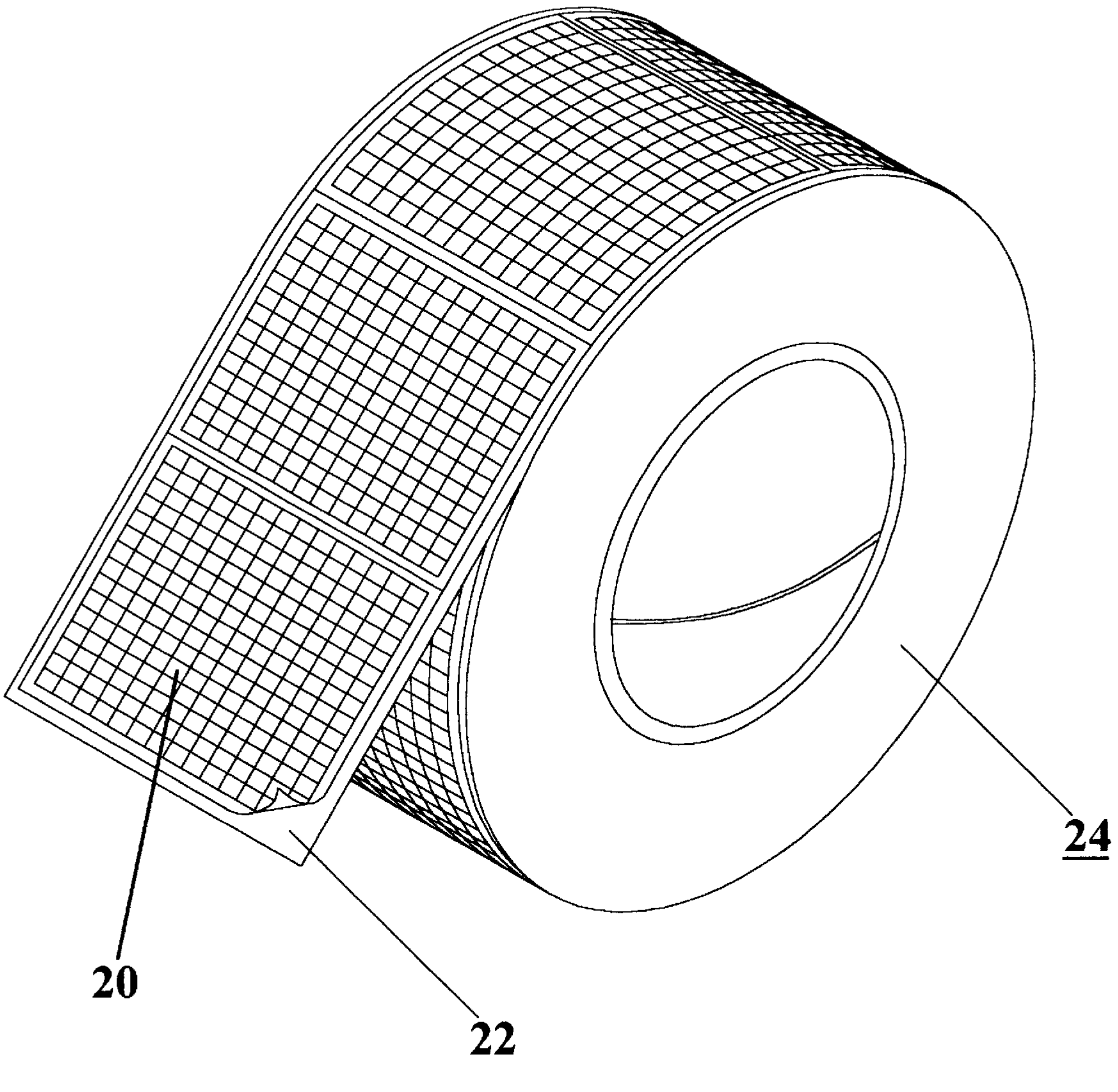
Figure 2-A

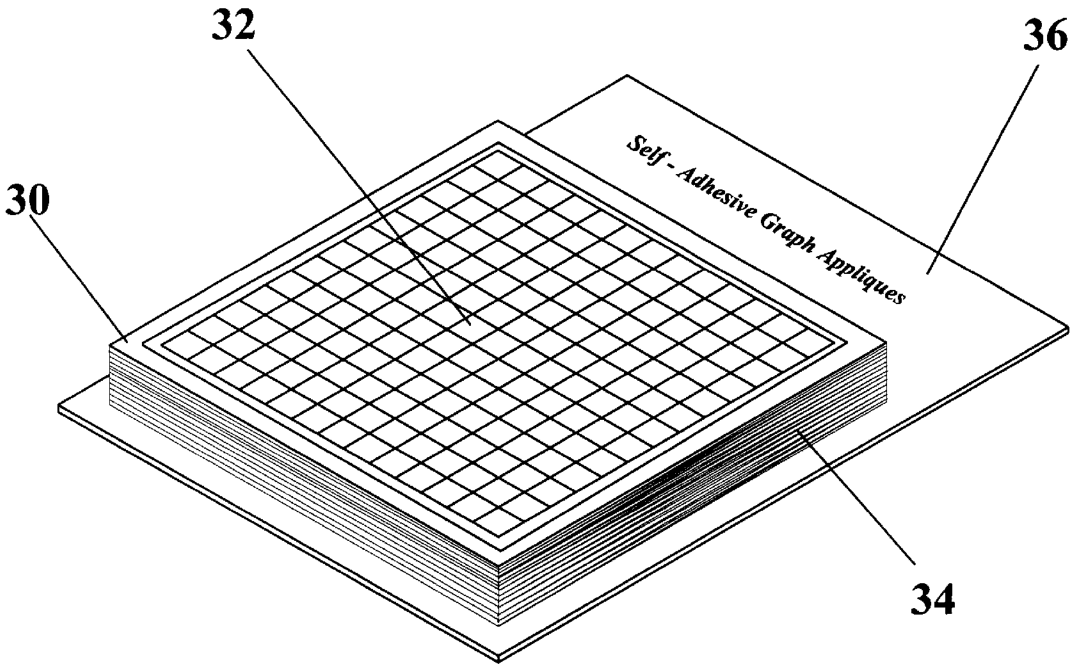
Figure 2-B

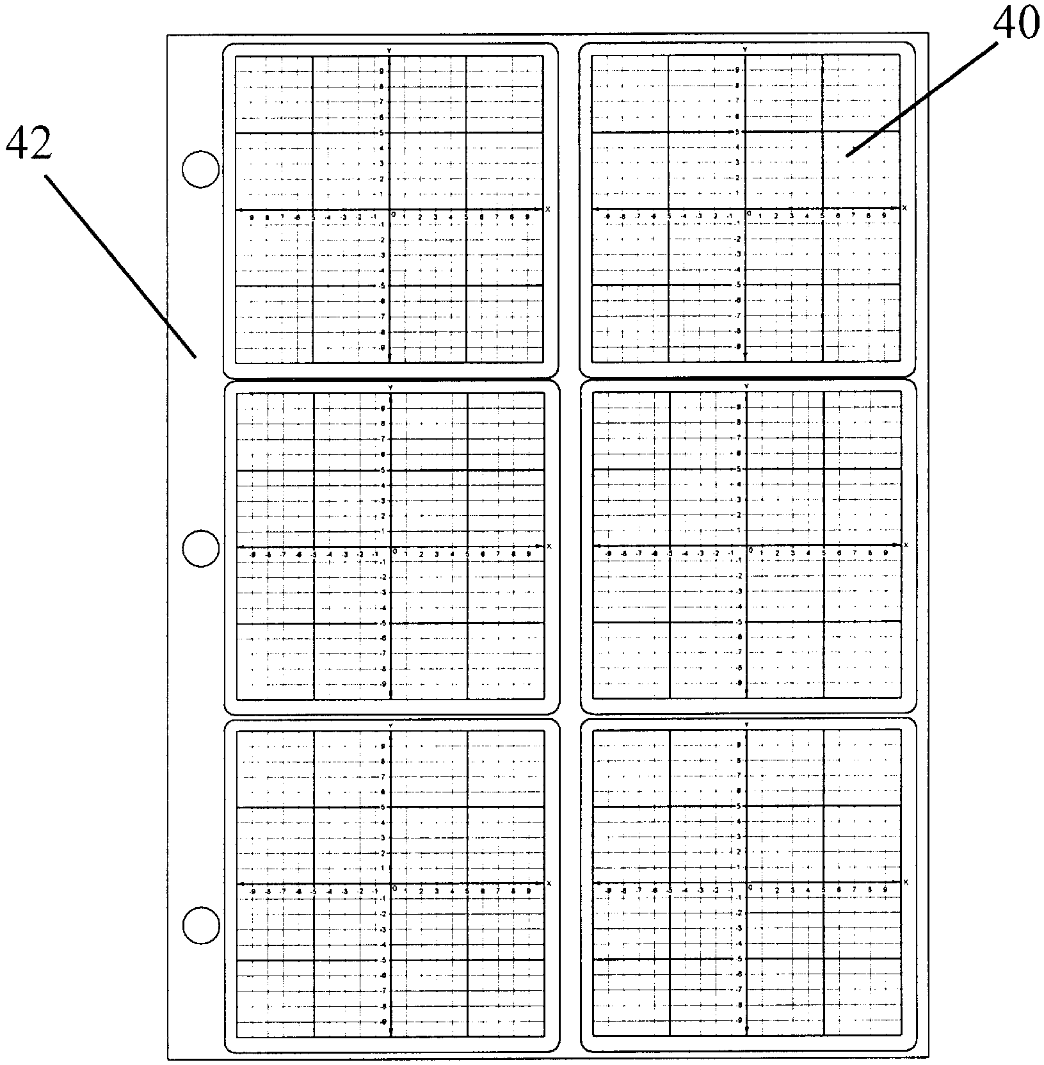
Figure 2-C

SELF-ADHESIVE GRAPH APPLIQUES

This application is a continuation of application Ser. No. 08/192,054, filed on Feb. 4, 1994 now abandoned.

BACKGROUND—FIELD OF INVENTION

This invention relates to graphs which are used in mathematics education, science, medical or business reports and specifically to a means of conveniently incorporating these graphs within text or calculations.

BACKGROUND—DESCRIPTION OF PRIOR ART

Small graphs frequently must be integrated into printed or hand-written text. For example, students studying mathematics often must perform calculations and then graph the results. Also, writers of scientific or business reports use graphs to summarize data, plot statistical process control (SPC) points, show trends, etc. These graphs are much more meaningful to the reader if they are incorporated into the text rather than attached to the report on a separate piece of graph paper.

Modern word-processing and spread-sheet computer software make excellent presentation-quality graphs and can merge them into text. However, these programs and the required hardware are beyond the means and skill levels of many people who must use graphs in their studies or businesses. Consequently, many students and small businesses continue to plot graphs in the same manner as they have for many years.

Students studying mathematics often perform their calculations on normal, lined paper and then graph the results on a separate piece of graph paper. This is inconvenient for both the student and for the teacher who must flip pages back and forth when correcting the work. The attached sheets are also frequently separated from the calculations and lost. Furthermore, this process is wasteful of expensive graph paper if only one or two small graphs are needed.

Consequently, to overcome the above objections, students often draw rough coordinate grids directly on their homework or report papers. Since this is time consuming, the grids are often crudely drawn and the results are sloppy and inaccurate. Teachers usually object to this tactic.

However, teachers also face the same difficulties as their students. Mathematics teachers, in particular, frequently make and reproduce work sheets or examination papers which incorporate small coordinate grids. Students must then plot equations, graph data, etc. directly on the small grids on these pre-printed sheets. Over the years, a number of products have been developed to assist teachers in this regard. However, these have their own disadvantages as will be shown below. Furthermore, these products are either impractical or of no use to individual students or report writers.

1. Rubber Stamp Coordinate Grids

Rubber stamp coordinate grids (and ink pads) are marketed in a variety of graph styles to assist teachers in over-coming the above difficulties. Although these are an improvement over hand-drawn coordinate grids, there are a number of disadvantages to these products:

a. The resolution and distinctness of the imprint from these rubber stamps are often poor. Not only is this detrimental to accuracy, but it also makes reproduction difficult. (These work sheets are usually used as masters and then copied for distribution to many students.)

b. The coordinate grid can not be removed or repositioned if a mistake is made in placement or graphing.

c. Ink pads are often messy and subject to drying out.

d. The graph which the student draws must be plotted directly on the base paper on which the small coordinate grid is printed. Often this paper is of low quality to minimize reproduction costs. In many cases, the types of paper used may cause "bleeding" of ink or poor contrast pencil lines. The erasing qualities of some types of paper are also poor.

e. The rubber stamps and ink pads are bulky and difficult to transport, especially for students.

f. The rubber stamps and ink pads, although reasonably priced for teachers who will use the product over a number of years, are too expensive for most students to purchase for a short usage period.

For the above reasons, the rubber stamp products are primarily used by teachers in making pre-printed homework or examination papers. They have limited usefulness for individual students and report writers.

2. Mimeograph-master Coordinate Grids

Small mimeograph-master coordinate grids (mirror-image) have been available for affixing to full-sheet mimeograph masters. These were then used on a mimeograph machine to make work sheets or examinations. Obviously these products have been used almost exclusively by teachers and have virtually no use to students and report writers. In addition, they have further disadvantages:

a. The mimeographic copy process is of relatively poor quality compared to the newer xerographic copy process. Consequently, coordinate grids reproduced by this process lack contrast and resolution.

b. The final graph is plotted directly on the mimeograph paper which frequently takes ink or pencil lines poorly. Erasing of pencil lines can also be difficult.

c. Mimeograph machines, in many cases, are being replaced by xerographic copiers. The mimeographic-master grids are a mirror-image and cannot be copied correctly on a xerographic copier.

Obviously, these products are not used at all by individual students and report writers.

3. Graph Paper Blackline Masters

High contrast, blackline graph paper masters are available to teachers so they can reproduce coordinate grids in full-sheet or partial-sheet form for their students. Small squares can be cut from these masters and glued to work sheets or examination papers prior to copying. This method yields high quality reproductions as compared to Items 1 and 2 above, but has the following disadvantages:

a. The process is inconvenient and time consuming because it involves cutting and pasting.

b. If small squares are cut from a larger master, the resulting small graph may have inappropriate or non-existent scale numbers.

c. Teachers are often reluctant to cut up their master graph paper to make work sheets or examinations.

d. As in the other methods above, the pencil, ink and erasing qualities of the final graph are dictated by the reproduction paper used.

In summary, until the conception of the invention described in this patent application, individual students and report writers have had no convenient, simple and inexpensive means of neatly incorporating small graphs into their calculations or reports. Furthermore, the methods that teachers and others currently use to incorporate small coordinate grids into reproducible work sheets, examinations, etc. have numerous disadvantages. These disadvantages are also alleviated by this invention as will be shown below.

OBJECTS AND ADVANTAGES

Accordingly the objects and advantages of my invention, self-adhesive graph appliques, are explained below. These small graph appliques permit students and report writers to easily and neatly incorporate graphs onto pages of calculations or within text. The advantages of affixing these adhesive-backed graph appliques directly onto blank areas provided in the calculations or report include the following:

1. Eliminates annoying paging back and forth between text and attached pages of graph paper. Reports and calculations are thus more readable.
2. Eliminates separation and loss of attached graph sheets.
3. Utilizing self-adhesive graph appliques eliminates the tedious process of hand-drawing coordinate grids on the report or calculation pages. Neatness and accuracy are enhanced.
4. These convenient appliques eliminate the tedious process of cutting graph paper into small sizes and pasting them onto the report or calculation page.
5. Eliminates the waste of an entire sheet of graph paper if only one or two small graphs are required.
6. The graph appliques can be provided in a wide variety of sizes and graph styles, including but not limited to:
   Rectangular coordinates (1st Quadrant only, Four Quadrants, etc.)
   Polar Coordinates
   Trigonometric (radians and degrees)
   Logarithmic
   etc.
7. A large assortment of applique graph styles can easily be transported in a binder or briefcase.
8. Generally, a removable adhesive is provided on the back of the graph applique to permit removal without ripping of the report paper to which it is affixed (eg. if a mistake in placement or graphing was made)
9. For applications where removal is not desirable, a permanent mounting adhesive can be provided.
10. The graph appliques can be constructed of high quality paper which is optimally selected for marking with pencil, ball point, felt-tip pens, etc. Thus a high quality graph can always be plotted, regardless of the type or quality of paper on which the report or calculations are written. This eliminates undesirable characteristics of some papers, such as:
    low-contrast pencil marks (such as on coated papers)
    poor pencil erasing qualities
    "bleeding" of inks, especially with felt-tip pens The above points enumerate some of the advantages that self-adhesive graph appliques offer to individual students and report writers. However, these appliques can also be advantageous to teachers and others who make reproducible masters requiring coordinate grids (mathematics worksheets, examinations, SPC forms, etc.)

1. The image quality (contrast, resolution, line width etc.) is much better than that afforded by rubber stamps or mimeograph masters.
2. The high quality self-adhesive graph applique (which is affixed to the master) copies well on ordinary copy machines.
3. The messy ink pad which is required for rubber stamp coordinate grids is eliminated.
4. A large assortment of applique graph styles can easily be carried in a binder or brief case. These graph appliques are much more transportable than a much smaller assortment of rubber stamps and their required ink pad.
5. The graph applique can easily be removed and modified or repositioned without ripping or harming the master.
6. An assortment of styles of graph appliques is less expensive than a rubber stamp and ink pad kit.
7. The self-adhesive graph appliques eliminate the time consuming and wasteful practice of cutting blackline graph paper and pasting the small grids onto worksheet or examination masters prior to duplicating.

BRIEF DESCRIPTION OF THE DRAWINGS

FIGS. 2A through 2C show various methods of packaging self-adhesive graph appliques attached to backing paper.

FIG. 2A Roll of graph appliques

FIG. 2B Fan-folded stack of graph appliques

FIG. 2C Sheet of graph appliques

In FIGS. 1 and 2A–2C the graph appliques are peeled from the backing paper as they are required for use. The backing paper is discarded.

DESCRIPTION AND OPERATION—FIGS. 1 AND 2A–2C

Figure 1:
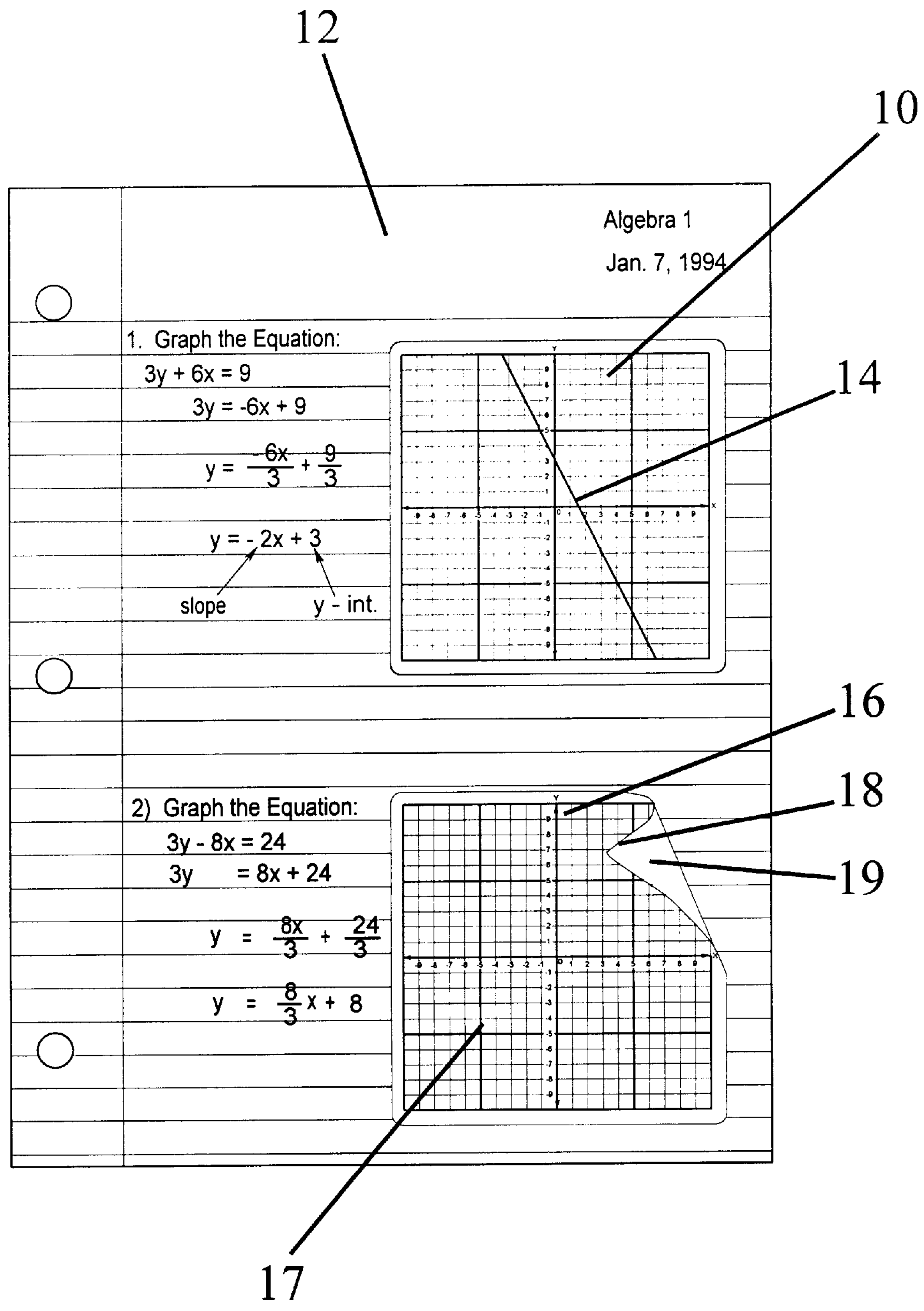
FIG. 1 shows self-adhesive graph appliques being utilized on a page of mathematical calculations—a typical but not exclusive application.

A typical use of the invention is shown in FIG. 1. A self-adhesive graph applique 10 has been applied to a sheet of mathematical calculations 12. As shown, a line 14 has been plotted on graph applique 10. A second adhesive-backed graph applique 16 is shown partially applied to sheet 12. As can be seen, the applique 16 consists of a coordinate system 17 printed on a flexible material 18. The reverse surface of flexible material 18 has an adhesive 19 applied to it. The rectangular, four-quadrant coordinate system shown on the graph appliques in FIG. 1 is for illustrative purposes only. Any type of graph coordinate system may be used (eg. polar coordinates, logarithmic, etc.)

FIGS. 2A through 2C are perspective views of various methods of packaging self-adhesive graph appliques which are affixed to backing paper. The backing paper is discarded after the graph applique is peeled off and used.

In FIG. 2A, numerous graph appliques 20 are attached to a long strip of backing paper 22. For convenience, the composite of appliques 20 and backing paper 22 is wound into a roll 24. The backing paper 22 is discarded as the appliques are peeled off for use.

In FIG. 2B, a long strip of backing paper 30 with numerous attached graph appliques 32 is shown fan-folded into a stack 34. Stack 34 is shown attached to a promotional backing 36.

In FIG. 2C, numerous graph appliques 40 are attached to a backing paper 42. Backing paper 42 is discarded after all graph appliques 40 have been removed for use.

Summary, Ramifications and Scope

Accordingly, the reader will see that the self-adhesive graph appliques of this invention can conveniently be used to incorporate neat and accurate graphs into written or typed text or calculations. These appliques save time for the writer and promote neatness and accuracy. They also eliminate frustration on the part of the reader because they eliminate constant paging between text and attached graphs.

The use of removable adhesive permits the appliques to be removed or repositioned without ripping the report or calculation paper. However, if desired, they can be provided with permanent adhesive to prevent tampering, for example.

Although the description above contains many specifics for illustrative purposes, these should not be construed as limiting the scope of the invention. For example, the appliques can be any shape and have any coordinate system printed on them. The appliques can be made of any flexible material, opaque or transparent.

Thus the scope of the invention should be determined by the appended claims and their legal equivalents, rather than by the examples given.

I claim:

1. A method for incorporating a graph onto an existing written page of text or calculations comprising the steps of:

a. attaching a graph applique to said existing written page of text or calculations such that the entirety of said graph applique overlies said existing written page of text or calculations, said graph applique comprising:
   i. a coordinate grid system printed onto a top surface of a sheet of material
   ii. an adhesive applied to at least a portion of a reverse surface of said sheet of material b. plotting a graph upon said coordinate grid system.

2. The method according to claim 1 further including the step of:

a. removing said adhesive, and in turn, said graph applique from a releasably attached backing sheet prior to the step of attaching said graph applique to said existing written page of text or calculations.

3. The method according to claim 1 further including the step of:

a. removing said graph applique from said existing written page of text or calculations after the step of attaching said applique to said existing written page of text or calculations.

4. The method according to claim 1 further including the step of a. selecting said graph applique from the group consisting of:
   i. rectangular coordinate graph appliques
   ii. polar coordinate graph appliques
   iii. logarithmic coordinate graph appliques
   iv. trigonometric coordinate graph appliques prior to the step of attaching said graph applique to said existing written page of text or calculations.

5. The method according to claim 1 further including the step of:

a. selecting said graph applique from the group consisting of:
   i. permanent adhesive graph appliques
   ii. pressure-sensitive adhesive graph appliques
   iii. removable adhesive graph appliques prior to the step of attaching said graph applique to said existing written page of text or calculations.

6. The method according to claim 1 further including the step of:

a. selecting said graph applique from the group consisting of transparent graph appliques and opaque graph appliques prior to the step of attaching said graph applique to said existing written page of text or calculations.

7. The method according to claim 1 further including the step of a. selecting said graph applique from the group consisting of pencil-markable graph appliques and pen-markable graph appliques prior to the step of attaching said applique to said existing written page of text or calculations.

* * * * *

US006159329C1

(12) EX PARTE REEXAMINATION CERTIFICATE (5134th)

United States Patent

Tschanz

(10) Number: US 6,159,329 C1

(45) Certificate Issued: Jul. 5, 2005

(54) SELF-ADHESIVE GRAPH APPLIQUES

(75) Inventor: Charles M. Tschanz, 304 High Point Dr., Lindenhurst, IL (US) 60046

(73) Assignee: Charles M. Tschanz, Lindenhurst, IL (US)

Reexamination Request:
No. 90/005,987, Apr. 23, 2001

Reexamination Certificate for:

Patent No.: 6,159,329
Issued: Dec. 12, 2000
Appl. No.: 08/608,964
Filed: Feb. 29, 1996

Related U.S. Application Data

(63) Continuation of application No. 08/192,054, filed on Feb. 4, 1994, now abandoned.

(51) Int. Cl.[7] .................... B32B 31/00

(52) U.S. Cl. .................... 156/277; 156/297; 156/299; 283/81; 428/40.1; 428/914; 434/188; 434/211; 434/197; 434/365

(58) Field of Search .................... 156/277, 297, 156/299; 283/81; 428/40.1, 914; 434/188, 211, 197, 365

(56) References Cited

U.S. PATENT DOCUMENTS 3,812,600 A * 5/1974 Rondello .................... 434/430
4,109,938 A * 8/1978 Mitchell et al. .............. 283/43
4,624,639 A * 11/1986 Wong .......................... 433/55
5,227,209 A * 7/1993 Garland ..................... 428/42.1
5,265,605 A * 11/1993 Afflerbach .................. 600/300
5,370,538 A * 12/1994 Sidray ........................ 434/211

OTHER PUBLICATIONS

1988 Bebco Sales Manual ID 38670, pp. 1,3 and 20.*

Barton Nelson Incorporated, inside front cover, Bebco 1988 Sales Manual ID 38670, BNI, Kansas City, MO, USA.

Barton Nelson Incorporated, extra charges, Bebco 1988 Sales Manual ID 38670, p. 3, BNI, Kansas City, MO, USA.

Barton Nelson Incorporated, stock design notes, Bebco 1988 Sales Manual ID 38670, p. 20, BNI, Kansas City, MO, USA.

United States Patent Office, patent history file, Ser. No. 08/608,964 (Tschantz) Amendment A (continued), p. 3.

United States Patent Office, patent history file Ser. No. 08/608,964 (Tschantz) Chart II p. 3a.

* cited by examiner

*Primary Examiner*—William P. Watkins, III

(57) ABSTRACT

A method of incorporating small graphs on to pages of text or calculations by using small adhesive-backed appliques or labels which have been pre-printed with a graphical coordinate grid. These appliques eliminate the necessity of a separate piece of graph paper or the tedium of drawing or gluing a coordinate grid directly on the report or calculation page.

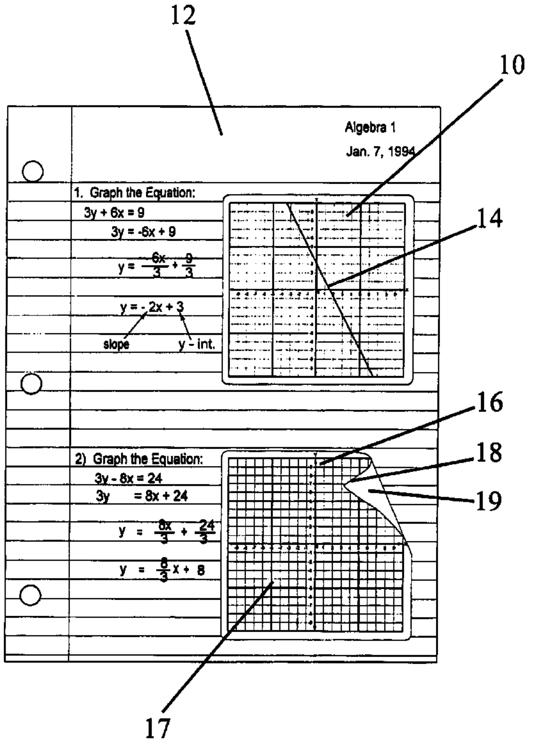

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–7 are cancelled.

* * * * *